United States Patent

[11] 3,599,139

| [72] | Inventor | Malcolm E. Low<br>Annisquam, Mass. |
|---|---|---|
| [21] | Appl. No. | 807,169 |
| [22] | Filed | Mar. 14, 1969 |
| [45] | Patented | Aug. 10, 1971 |
| [73] | Assignee | BLH Electronics, Inc.<br>Waltham, Mass. |

[54] STRAIN GAGE PROTECTIVE COVER
10 Claims, 4 Drawing Figs.

[52] U.S. Cl. .................................................... 338/2,
338/256
[51] Int. Cl. .................................................... H01c 1/02
[50] Field of Search ......................................... 338/2, 3,
256, 251; 174/50.5, 50.6

[56] References Cited
UNITED STATES PATENTS

| 2,743,308 | 4/1956 | Bardsley | 174/52 |
| 3,089,107 | 5/1963 | Dean | 338/2 |
| 3,445,800 | 5/1969 | Ambulos | 338/2 |

Primary Examiner—Rodney D. Bennett, Jr.
Assistant Examiner—R. Kinberg
Attorney—Thomson & Mrose ABSTRACT: A strain gage covering, a method for waterproofing, saltproofing and protecting strain gages from environmental stresses, and a protected strain gage assembly wherein a strain gage is covered by a plural layered laminated having a first layer of a rubberlike elastomer, characterized by a modulus of elasticity of less than $10^7$ p.s.i., adhesively bound to a second layer of a soft, compliant, moldable hydrocarbon resin which is sag free and resilient at temperatures of at least 180° F.

PATENTED AUG 10 1971
3,599,139
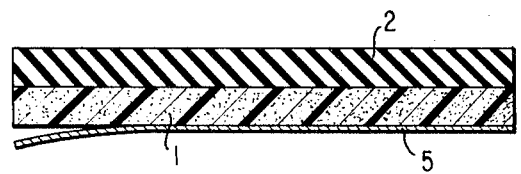
FIG. 1
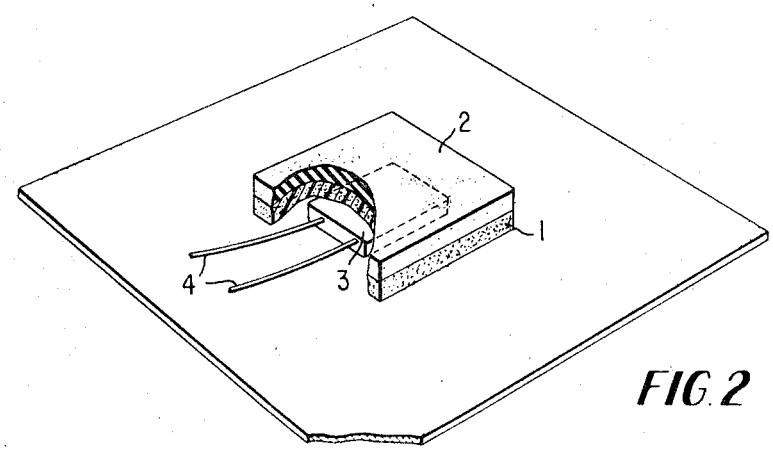
FIG. 2
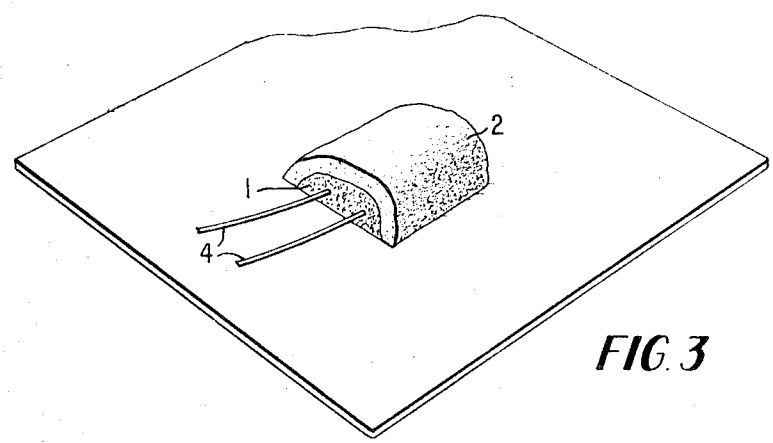
FIG. 3
FIG. 4
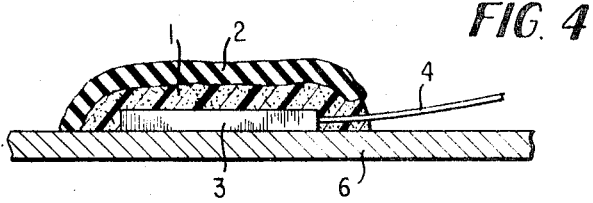
INVENTOR
MALCOLM E. LOW
by
Thomson, Wrose & Ericson
ATTORNEYS

STRAIN GAGE PROTECTIVE COVER

BACKGROUND OF THE INVENTION

This invention relates generally to a barrier device useful for protecting electrical strain gages and more particularly to a plural layered laminate of a compliant, moldable elastomeric material and a flexible, rubberlike backing, which is characterized by good electrical and weatherproofing properties and which is especially useful for protecting strain gages, such as wire resistance strain gages or semiconductor type strain gages, from environmental degradation.

Strain gages are increasingly being used in areas where the objects being monitored are located in regions of severe environmental extremes. Accordingly, it is essential that the strain gages be protected from all types of deleterious weathering conditions which would tend to wash, scrape or otherwise reduce the efficiency of the gages.

One technique suggested for protecting strain gages is to coat the gages with a suitable protective material so as to encase the gages, preventing their exposure to environmental wear and abuse. Although a large variety of such coatings have been proposed, none have proven to be entirely satisfactory both from the viewpoint of protection as well as from the viewpoint of ease of installation.

In developing protective coverings for strain gages, a number of factors peculiar to the strain gage technology must be considered. Foremost, the protective covering must be sufficiently tough to resist puncturing and tearing. It should also be sufficiently waterproof and salt repellent so that it can protect the gages even when they are used in an entirely water submerged environment, such as water tanks, river channels or deep sea applications.

One of the most important attributes of a good strain gage covering is that it be capable of flowing around the leads of the gage as well as around the gage itself in order that the total strain gage system be completely sealed from the surrounding environment. Although it is nor particularly difficult to prepare a material characterized by sufficient flow properties to encase the gage, only a highly flowable material can be worked around the leads of the gage as well. Moreover, by using a protective covering which is sufficiently flowable, a constant, waterproof seal around the strain gage system can be maintained without hindering the movements of the gage as it is strained in response to the strains on the base. Further, a flowable material will permit a good seal even if the leads of the gage are accidentally dislodged.

While any one of a number of highly flowable materials known in the art can provide a satisfactory waterproof seal, one of the problems with using a highly flowable material is that it can be easily wiped away with relatively little force thereby destroying the seal. For this reason, many of the prior art covering materials, including certain varnishes, waxes and greases including silicone greases, have proven to be partially or wholly unacceptable for applications in which the gage is subjected to both high moisture conditions and high abrasive action conditions. Some of these materials, such as certain waxes, are unacceptable since they not only restrain movement of the gage, but also tend to leak when the leads of the gage are accidentally dislodged. Other of these materials are unacceptable since they react deleteriously with a bonding adhesive or cement used to secure the strain gage to the base.

Another expedient suggested by the prior art is the use of metal foils as a protective covering for strain gages. This expedient however, has also proven to be wholly or partially inadequate, since a strip of foil, which is thick enough to withstand tearing and puncturing forces, is generally too highly heat conductive and insufficiently pliable to be easily worked around the gage or its leads, such as by simple hand pressure. Moreover, most metal foils are electrically conductive and special precautions must be taken to insulate the foil from contact with the gage itself.

Thin plastic strips have also been suggested, but none of those suggested combine the desirable degree of wear resistance with a desirable degree of pliability and flexibility.

The art has also disclosed a number of laminated structures in an attempt to combine the good sealing properties and flowability of one material with the toughness and wear resistance of another. None of these combinations, however, have proven successful and in general those disclosed in the prior art fail to provide the combination of ease of application with adequate environmental protection. One such laminate, for instance, is formed by sequentially coating the gage with a soft waxlike material such as beeswax, with a curable synthetic rubber. It is then necessary to cure the rubber to form a waterproof, void-free protective assembly, which requires special equipment and complex techniques, especially where the coatings are applied under conditions of environmental extremes. Moreover, beeswax is insufficiently flowable to prevent leaks from developing around the gage leads in the event that the leads are accidentally shifted or dislodged. Another problem with this type of laminate is that the wax will not adhere tenaciously to the commonly used fluorocarbon, hydrocarbon or nylon covered leads often used in commercial strain gages.

A need existed therefore for a protective covering which is sufficiently pliable to be molded into place around the strain gage by simple techniques, such as ordinary hand pressure in order to form a waterproof seal; which is sufficiently flowable to permit movement of the strain gage in response to strains on the base; and which is sufficiently tough to resist tearing and puncturing; yet which is nonreactive with the adhesive or cement used to secure the strain gage to the base and which has good adhesive properties for most substrates including Teflon, nylon and polyethylene.

SUMMARY OF THE INVENTION

By way of a summary account of underlying recognitions and of preferred practice of this invention, there is provided herein a laminated structure comprising first and second layers, the second being a layer of a soft, compliant, moldable resinous substance characterized by good adhesive properties, good electrical insulation properties and both good water repellancy and salt resistance, which is bonded with a first layer of a rubberlike material having a modulus of elasticity of less than $10^7$ p.s.i. and preferably less than 350 p.s.i., such as neoprene rubber.

Since the rubber backing is characterized by a high degree of flexibility and elasticity, and the resinous layer is soft and pliable, the resinous material can be worked around the gage and its leads by simple hand pressure applied to the rubber backing so as to completely seal the gage from the surrounding environment.

Accordingly, it is an object of this invention to provide a novel and improved protective covering for strain gage devices, which can be easily and quickly applied by hand pressure.

It is further an object of this invention to provide a protective covering for strain gages which is characterized by good wear resistance, good water repellancy and good salt resistance, and which is sufficiently strong to resist tearing or puncturing.

Another object of this invention is to provide a protective covering for strain gages which is not reactive with the bonding means used for securing the strain gage to the base and which can be adhesively applied to fluorocarbon, and hydrocarbon and nylon substrates such as those currently used for insulating leads of many commercial strain gages.

Still another object is to provide a protective covering for strain gages which will not hinder the movement of the gage in response to the strain on the base.

A further object of this invention is to provide a laminated protective covering for strain gages including first and second layers in which the second layer of the laminate is a soft, flowable, compliant material which has good electrical properties, good adhesion properties and good salt and water repellancy, bonded with a first layer of the laminate which is a tough, rubberlike material which is strongly resistant to tearing or puncturing.

Although the features of this invention which are considered to be novel are set forth in the appended claims, further details as to preferred practices and as to the further objects and advantages thereof may be most readily comprehended with reference to the following description taken in connection with the accompanying drawings.

BRIEF DESCRIPTION OF THE DRAWINGS

FIG. 1 is a cross sectional side view of a protective covering laminate of the present invention with a temporary, peelable protective film over the soft, resinous layer;

FIG. 2 is a diagrammatic perspective view of a strip of the protective covering laminate of the present invention as it is applied to a wire resistance type strain gage;

FIG. 3 is a diagrammatic perspective view of a strip of the protective covering laminate of the present invention after it is applied to a wire resistance type strain gage;

FIG. 4 is a cross sectional side view of the protective covering laminate of the present invention in sealing relation with a wire resistance type strain gage.

DETAILED DESCRIPTION OF THE INVENTION

According to the present invention, a protective covering for strain gages is provided which comprises a laminate structure of first and second layers, the second layer of a soft, compliant moldable, resinous substance being bonded with a first layer of a rubberlike material.

The particular materials are selected so that the compliant second layer can be worked and molded around the contours of the strain gage and its leads by applying pressure through the elastic and flexible rubberlike first layer. For ease of application, it is most preferable that the amount of pressure required to mold the resinous second layer be no greater than that which can be applied by hand. Unlike many prior art protective coverings, therefore, the protective covering of the present invention can be applied manually without the use of special equipment or special complex techniques. Moreover, since the compliant second layer is selected for its moldable and flowable or puttylike properties, it will form a tight, waterproof seal around the strain gage, yet will not hinder the movement of the gage as it is strained in response to the strains on the supporting base. Also, any accidental movement of the leads of the strain gage will not produce cracks or leaks in the protective covering since the resinous material will flow and fill any formed crevices.

Another characteristic of the moldable second layer is that it possesses excellent adhesive properties which enables it to adhere tenaciously to all types of substances especially fluorocarbons, such as Teflon; hydrocarbons such as polyethylene; and nylon materials now commonly used for insulating the leads of many commercially available strain gages. Good adhesion with the leads of the gage is important since it effectively prevents moisture from seeping into the gages along the lead wires.

In the present invention, it has been found that a butyl rubber containing mixture of hydrocarbon elastomers, produced under the trade name "Aqua Seal" and produced by the Kearney Company, St. Louis Missouri, is especially suitable for use as the compliant second layer. This material is a nonoxidizing, 100 percent solids mixture, having a specific gravity of 1.44 to 1.51. Its water permeability is 0 percent for a one-eighth inch membrane MIL-S19653a. Although it is soluble in most common solvents, such as acetone, MEK, naphtha and carbon tetrachloride, it is relatively nonsoluble in water and alcohol. At −20°F., it remains resistant to cracking when bent over a one-fourth inch mandrel and at 180° F. It is sag free with no loss in resiliency. Drying does not begin until 300° F. at 50 hours. This material possesses the following desirable electrical properties.

dielectric constant
 0 60 Hertz = 8.80
 0 1 K Hertz = 6.10
 0 1 meg. Hertz = 3.25
dissipation factor
 0 60 Hertz = 0.192
 1 K Hertz = 0.194
 0 1 meg. Hertz = 0.182
power factor
 0 60 Hertz = 18.8
 0 1 K Hertz = 19.0
 0 1 meg. Hertz = 17.8

The rubberlike backing may be any elastomeric material having a modulus of elasticity of under $10^7$ p.s.i., and preferably under 350 p.s.i. Rubberlike materials possessing a modulus of elasticity of greater than $10^7$ p.s.i. are generally too inflexible and too inelastic to permit manual application of the protective covering to the strain gage. A wide variety of rubber and rubberlike materials can be used for the backing layer of the laminate. For example, suitable materials include neoprene rubber, isoprene rubber, butadiene rubber, such as copolymers of butadiene and styrene (GR-S) or copolymers of butadiene and acrylonitrile (GR-N), cured butyl rubber and the like.

Thicknesses of the respective layers of the protective covering are dependent upon the particular size and thickness of the strain gages intended to be covered. Preferably, in order to cover most commercially available strain gages, the compliant moldable layer should have a thickness of between about one thirty-second of an inch to one-fourth of an inch, and most preferably a thickness of about one-eighth of an inch. The rubber like layer should have a thickness of between about one sixty-fourth of an inch to about one-sixteenth of an inch and most preferably a thickness of about one thirty-second of an inch.

Referring now to the figures, a diagrammatic cross section of the laminate protective covering of this invention is shown in FIG. 1. The compliant and moldable layer 1 is adhered to a rubber like layer 2. To protect the compliant material before use, the surface of the compliant layer opposite the surface bound to the rubberlike layer is covered with a peelable protective film 5 which will not strongly adhere to the compliant material. Any suitable release paper can be used for this purpose including silicone release agent treated paper, wax paper, resin impregnated paper and the like. Since the complaint material will strongly adhere to Teflon and polyethylene, obviously these materials are unuseable as the peelable protective film.

When ready for use, as shown in FIG. 2, the protective film is peeled from the laminate and the laminate is placed over the strain gage 3 with its auxiliary leads 4 by its flowable compliant side in contact with the gage.

Manual pressure is applied to the outer surface of the rubberlike layer 2 so as to mold the compliant layer 1 around the contours of the strain gage, as shown in FIG. 3. The leads 4 are also sealed from the environment by the compliant layer which forms a strongly adherent and moistureproof bond with the leads.

This can better be seen by reference to FIG. 4, which is a diagrammatic cross-sectional side view of a strain gage 3 with leads 4 on base 6 encapsulated with a protective laminate of compliant material 1 and rubberlike material 2. The compliant material 1 flows around the contours of the strain gage 3 and around the portion of leads 4 in adjacent proximity to the gage.

In forming the protective covering laminate, a strip of the rubberlike material is provided and one surface is cleaned free of dust particles and impurities by mechanical wiping, and if necessary by a solvent wipe with acetone or methyl ethyl ketone. The compliant flow material is also provided in strips, generally with the aforementioned peelable protective films loosely adhered to both its upper and lower surfaces. One of the films is removed and the exposed surface is pressed lightly into contact with the precleaned rubberlike strip. The combined strip of rubberlike material, compliant material and protective film is then cut to the desired size and is ready for use.

The effectiveness of the protective covering of the present invention was compared with that of prior art covering materials and the results are summarized in the following table. In this table, DiJell is a commercial, greaselike wax and Cerese is a solid wax. These commercial coverings were compared with a neoprene-Aqua Seal laminate wherein a neoprene layer is one thirty-second of an inch thick and the Aqua Seal layer is one-sixteenth of an inch thick.

| Environment | DiJell | Cerese | Neoprene-Aqua Seal Laminates |
|---|---|---|---|
| weathering | P | F | E |
| moisture | E | E | E |
| Water (immersion) | E | E | E |
| Salt Water (immersion) | G | G | G |
| Salt spray | P | G | G |
| mechanical reinforcing | P | F | E |
| immediate use | L | M | L |
| life immersed in still water at 70° F. in days | Y | N | Y |
| | 60 | 60 | 60 |

Code

| | |
|---|---|
| E—Excellent | L—Low |
| G—Good | M—Medium |
| F—Fair | N—No |
| P—Poor | Y—Yes |

In applying the laminate to a strain gage, the protective film or paper backing is peeled off and the laminate is manually pressed to the strain gage. The gage insulation leads should be precleaned with a clean solvent, such as acetone, and purged with a gas propelled liquid such as Freon TF to remove residues and lint solids. The laminate is smoothed to insure that the perimeter is firmly and completely bonded. At the lead exit area, the laminate is lifted and bent backwards so that the complaint material can be squeezed under and around the leads.

Many modifications can be made to the present invention without departing from its spirit or scope. For example, various rubber reinforcing pigments and additives can be added to the compliant material to improve its permeability and toughness, as is well known in the art. Also, an additional layer of a structurally stronger material, can be applied to the upper surface of the rubberlike layer to improve the structural stability of the laminate. Accordingly, it should be understood that the embodiments and practices herein described have been presented by way of disclosure rather than limitation, and that various modifications, combinations and substitutions may be effected by those skilled in the art without departure from this invention in its broader aspects and as set forth in the appended claims.

What I claim and intended to be covered by Letters Patent is:

1. A strain gage covering for waterproofing, saltproofing and protecting strain gages from environmental stresses which comprises a plural layer of laminate having a first layer of a rubberlike elastomer characterized by a modulus of elasticity of less than $10^7$ p.s.i. adhesively bonded to a second layer of a soft, compliant, moldable hydrocarbon resin which is sag free and resilient at temperatures of at least 180° F., and which is capable of being molded around the contours of said strain gage and around the leads of said strain gage so as to provide a waterproof and moistureproof seal around said gage.

2. The strain gage covering of claim 1 wherein said rubberlike elastomer is selected from the group consisting of neoprene rubber, isoprene rubber, butadiene rubber and cured butyl rubber.

3. The strain gage covering of claim 2 wherein said rubberlike elastomer is neoprene rubber.

4. The strain gage covering of claim 1 wherein said soft, compliant, moldable hydrocarbon resin is a butyl rubber containing mixture of hydrocarbon elastomers.

5. The strain gage covering of claim 1 wherein said first layer of rubberlike elastomer has a thickness of from one sixty-fourth of an inch to about one-sixteenth of an inch, and said second layer of soft, compliant, moldable hydrocarbon resin has a thickness of from one thirty-second of an inch to about one-eighth of an inch.

6. The strain gage covering of claim 1 wherein a peelable protective film is loosely bound to the surface of the soft, complaint, moldable hydrocarbon resin layer opposite the surface bound to the rubberlike layer.

7. A strain gage assembly comprising a wire resistance-type strain gage having insulated leads extending therefrom, bonded to a base, a strain gage covering for waterproofing, saltproofing and protecting strain gages from environmental stresses which comprises a plural layered laminate having a first layer of a rubberlike elastomer characterized by a modulus of elasticity of less than $10^7$ p.s.i., adhesively bound to a second layer of a soft, compliant, moldable hydrocarbon resin which is sag free and resilient at temperatures of at least 180° F., said laminate being adhesively secured to said strain gage such that said soft, hydrocarbon resin is molded around the contours of said strain gage and around said leads of said strain gage so as to provide a waterproof and moistureproof seal around said gage.

8. The strain gage assembly of claim 7 wherein said rubberlike elastomer is neoprene rubber.

9. The strain gage assembly of claim 7 wherein said soft, compliant, moldable hydrocarbon resin is a butyl rubber containing mixture of hydrocarbon elastomers.

10. A method for waterproofing, saltproofing and protecting a strain gage from environmental stresses which comprises bonding a strain gage to a base surface with electrical leads extending therefrom, manually pressing atop the strain gage, base surface, and leads, a laminate comprising a first layer of a rubberlike elastomer characterized by a modulus of elasticity of less than $10^7$ p.s.i. adhesively bound to a second layer of a soft, compliant, moldable hydrocarbon resin which is sag free and resilient at temperatures of between 180° F. and 300° F., and then manipulating the hydrocarbon resin through the first layer until the resin is molded around the contours of said strain gage and around the leads of said strain gage and is adhered to the base surface, whereby to provide a waterproof and moistureproof seal for said gage.